United States Patent [19]
Hanson

[11] Patent Number: 6,099,881
[45] Date of Patent: Aug. 8, 2000

[54] METHOD OF CURING FOOD PRODUCTS

[75] Inventor: Robert E. Hanson, Madison, Wis.

[73] Assignee: DEC International, Inc., Madison, Wis.

[21] Appl. No.: 09/179,365

[22] Filed: Oct. 26, 1998

[51] Int. Cl.$^7$ .................................. A23B 4/12; A23L 1/27
[52] U.S. Cl. .......................... 426/263; 426/264; 426/281; 426/641; 426/644
[58] Field of Search ..................................... 426/263, 264, 426/281, 641, 644

[56] References Cited

U.S. PATENT DOCUMENTS

| | | | |
|---|---|---|---|
| 2,930,703 | 3/1960 | Harper | 426/263 |
| 4,113,885 | 9/1978 | Zyss | 426/264 |
| 4,299,852 | 11/1981 | Ueno et al. | 426/641 |

*Primary Examiner*—Arthur L. Corbin
*Attorney, Agent, or Firm*—Andrus, Sceales, Starke & Sawall

[57] ABSTRACT

A method of curing meat, or other food products, using nitrogen dioxide gas. In a preferred method, the food product is exposed to nitrogen dioxide gas at a concentration in excess of 0.4 ppm. The nitrogen dioxide gas reacts with moisture in the food product to produce nitrous acid which diffuses throughout the product to cure the product and produce the pink "cured" color pigment. In an alternate method, the nitrogen dioxide gas is dissolved in water to produce a solution containing nitrous acid, and the solution is injected into the food product to produce the cured color pigment.

3 Claims, No Drawings

METHOD OF CURING FOOD PRODUCTS

BACKGROUND OF THE INVENTION

In the past, meat products, such as sausages, ham, bologna, bacon, corned beef, and the like, have been cured by injecting a curing solution containing sodium nitrite and other salts, into the product. The product is then heated to a temperature of about 150° F. to 165° F. and smoked for a period of about 1 to 16 hours. Thereafter, the product is chilled and can then be sliced and packaged. The cured product normally has a distinct pink "cured" color throughout its cross-section.

With the use of a nitrite curing solution, residual nitrites will normally remain in the food product. There has been a concern that nitrites can have adverse health effects and, therefore, there has been a desire to develop a curing process for meat and poultry that does not include nitrites U.S. Pat. No. 3,393,629 is directed to a process for the rapid curing of meat products using nitric oxide gas. In the process of that patent, the meat product is initially subjected to an acid treatment, preferably using lactic acid. The treated meat product is then placed in a chamber where it is exposed to a nitric oxide atmosphere at an elevated temperature to develop the cure. Following the curing cycle, the meat product is passed through a final chamber which contains a chilling atmosphere. According to the patent, the process provides a rapid cure and develops the desired cured color in the meat product.

SUMMARY OF THE INVENTION

The invention is directed to an improved process for curing meat and poultry products using nitrogen dioxide ($NO_2$) gas instead of the commonly used sodium nitrite as the curing agent.

In a preferred form of the invention, the product, which can take the form of sausages, ham, bologna, corned beef, turkey, bacon, jerky, chicken, or the like, is exposed to $NO_2$ gas in a chamber or tumbler. The $NO_2$ gas reacts with moisture in the food product to produce nitrous and nitric acid. It has been found that nitric acid has no appreciable influence on curing or development of color, but the nitrous acid diffuses throughout the product and produces the classic pink "cured" color via the common meat curing reaction associated with brines containing sodium nitrite.

In the preferred form of the invention, the concentration of the $NO_2$ gas in the chamber or tumbler should be maintained above 2.0 ppm and preferably above 4.0 ppm when curing beef products. However, with poultry lesser levels are required, and the concentration of the $NO_2$ gas should be above 0.4 ppm.

In a modified form of the invention, the $NO_2$ gas can be dissolved in water to produce a curing solution containing nitrous acid. The curing solution, which can also contain brine, along with conventional phosphate salts, can then be injected into the product in the conventional manner to produce the cure.

The invention provides a method of curing meat and poultry products that duplicates the color, flavor and texture of products cured by conventional injection methods, but without the use of sodium nitrite.

The process can be used with any product that is normally cured, such as beef, corned beef, turkey, chicken, sausages, bacon, jerkey, ham and the like.

PREFERRED EMBODIMENT OF THE INVENTION

The invention is directed to an improved method of curing meat products using $NO_2$ gas instead of sodium nitrite as is commonly used as the curing agent in injection curing methods.

The method of the invention can be used to cure both animal products and poultry, such as beef, corned beef, ham, bacon, jerky, sausages, chicken, turkey, and the like.

In a preferred form of the invention, the raw product is placed in a chamber or tumbler and exposed to $NO_2$ gas. The gas is present in the chamber or tumbler atmosphere at a concentration greater than 0.4 ppm when curing poultry products such as turkey or chicken, and is maintained at a concentration greater than 2.0 ppm when curing meat products such as beef, pork, sausage, or the like. In practice, it is preferred to maintain the concentration of $NO_2$ gas at a value of 0.4 to 5.0 ppm when curing poultry, and at a value of 2.0 to 5.0 ppm when curing beef or pork. Because $NO_2$ is highly water soluble, the relative humidity in the chamber or tumbler should be kept at 60% to 100% to keep the product surfaces moist, thus maximizing the $NO_2$ absorption into the product.

The time period during which the product is exposed to the $NO_2$ gas is not critical and depends on the thickness and type of product. Similarly, the temperature of treatment is not critical and can vary from sub-ambient temperatures to elevated temperatures.

Under these conditions, the $NO_2$ gas will react with moisture in the food product to produce both nitrous acid and nitric acid. It has been found that the nitric acid has no appreciable influence on curing or color, since the muscle tissue is incapable of nitrate reduction to either nitrous acid or NO, thus precluding the possibility of the formation of nitrosylmyoglobin. However, the nitrous acid diffuses through the product and produces the classic pink "cured" color through the conventional curing reaction.

After curing, the product can be cooked and chilled, and then can be sliced and packaged in a conventional manner.

In a modified form of the invention, the $NO_2$ gas is dissolved in water to produce a curing solution containing nitrous acid. The curing solution can also contain brine, as well as conventional phosphate salts, as used with nitrite curing solutions. The curing solution can then be injected directly into the product, and in this case the nitrous acid will again produce the desired pink "cured" cured condition in the product.

U.S. Pat. No. 3,393,629 relates to an improved process for curing meat, in which the meat is initially subjected to an acid treatment and then exposed to an atmosphere of nitric oxide (NO). However, it has been found, through the present invention, that the use of $NO_2$ produces superior curing results over the use of NO gas. Gaseous NO, due to its low water solubility, has restricted entry into the aqueous biological system of the product. Because of this, NO must be present at relatively high concentrations, above 10 ppm to provide any curing effect. In contrast, curing can be achieved with the use of $NO_2$ at relatively low concentrations of 0.4 ppm for poultry and 2.0 ppm for meat products. Thus, the use of $NO_2$ provides a faster and more effective curing process than that which can be achieved through the use of gaseous NO.

Various alternatives and embodiments are contemplated as being within the scope of the following claims particularly pointing out and distinctly claiming the subject matter regarded as the invention.

I claim:

1. A method of curing a food product, comprising the steps of locating a food product containing moisture in a closed chamber, exposing the surface of the food product to nitrogen dioxide gas in the chamber, maintaining the relative humidity in the chamber at a value of 60% to 100%, maintaining the food product in the chamber in contact with said nitrogen dioxide gas for a period sufficient to cause the nitrogen dioxide gas to react with said moisture to produce nitrous acid, and thereafter diffusing the nitrous acid throughout the food product to produce a cured color pigment in the product.

2. The method of claim 1 wherein the food product comprises meat and the nitrogen dioxide gas in the chamber is maintained at a concentration greater than 2.0 ppm.

3. The method of claim 1, wherein the food product is poultry and the concentration of nitrogen dioxide gas in the chamber is maintained at a value greater than 0.4 ppm.

* * * * *